(No Model.)
C. A. LITTLEFIELD.
LOOM TEMPLE.
No. 456,118. Patented July 14, 1891.
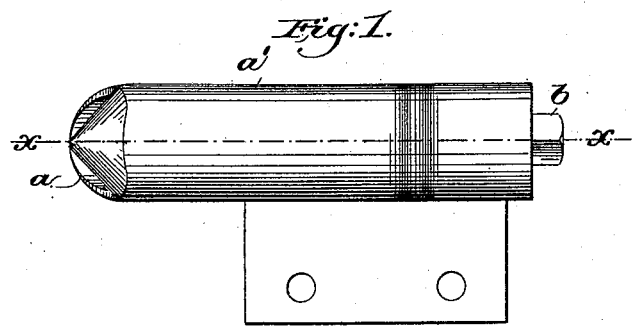
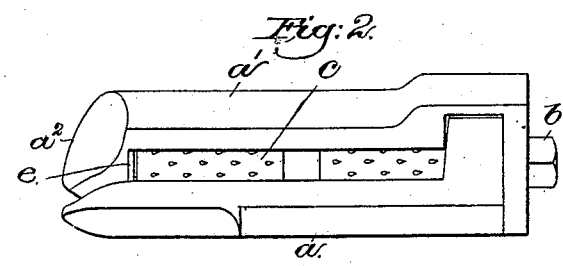
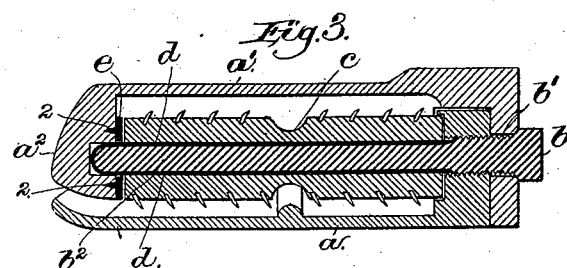
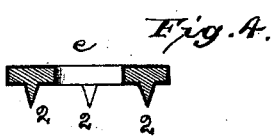
Witnesses.
Fred. S. Greenleaf
Edward F. Allen
Inventor:
Charles A. Littlefield
by Crosby & Gregory
Attys.
THE NORRIS PETERS CO., PHOTO-LITHO., WASHINGTON, D. C.

UNITED STATES PATENT OFFICE.

CHARLES A. LITTLEFIELD, OF MANCHESTER, NEW HAMPSHIRE, ASSIGNOR TO THE DUTCHER TEMPLE COMPANY, OF HOPEDALE, MASSACHUSETTS.

LOOM-TEMPLE.

SPECIFICATION forming part of Letters Patent No. 456,118, dated July 14, 1891.

Application filed June 18, 1890. Serial No. 355,841. (No model.)

*To all whom it may concern:*

Be it known that I, CHARLES A. LITTLEFIELD, of Manchester, county of Hillsborough, State of New Hampshire, have invented an Improvement in Loom-Temples, of which the following description, in connection with the accompanying drawings, is a specification, like letters and figures on the drawings representing like parts.

This invention has for its object to improve the construction of loom-temples in such manner as to obviate the use of oil between the toothed roll and the spindle upon which it turns.

Prior to this invention a toothed roll has run upon a glass spindle having one end connected to or supported by the screw employed to connect the cap and pod. The objections to a spindle of glass alone is that it is liable to be broken by careless handling. In my efforts to overcome this objection I have invented a spindle the body of which, for a short distance, is provided with a thread, and the remaining portion thereof is provided with a vitreous coating, which forms a permanent part of the same and constitutes a bearing for the temple-roll.

Figure 1 is a plan view of a sufficient portion of a temple-head to illustrate my invention; Fig. 2, a side elevation thereof; Fig. 3, a section in the line $x$, Fig. 1; and Fig. 4 is an enlarged section of the washer removed.

The pod $a$ and the cap $a'$, constituting the temple-head, and the toothed roll $c$ are and may be all of usual construction.

In accordance with my invention I have provided a metallic spindle $b$, threaded near its head end, as at $b'$, to enter screw-threads in parts of and thereby unite the pod and cap in usual manner, the remaining portion or long shank $b^2$ of the said spindle being coated with a vitreous coating $d$, which is baked or run thereon in any usual manner. The end of the spindle referred to farthest from its threaded portion takes bearing in a lip, as $a^2$, of the cap. It will be understood that the draft upon the temple-roll by the cloth is always toward the center line of the cloth. Hence to form a smooth bearing for the end of the temple-roll nearest the center of the cloth I have interposed a washer $e$, which is coated with vitreous material, said washer preferably having pins or points 2, which enter suitable cavities in the portion $a^2$ of the cap; but the said pins may be omitted, if desired.

It is not desired to limit this invention to the exact construction shown for the spindle, as it may be modified in shape to adapt it to other well-known forms of temple head and roll.

Prior to my invention I am not aware that the metallic spindle of a temple-roll has ever been provided with a vitreous coating forming a permanent part thereof.

I claim—

1. A temple-head composed of a trough and cap and a roll, combined with a vitreous-coated metallic spindle to support the said roll, substantially as described.

2. A metallic spindle for temple-rollers, having a screw-threaded portion for part of its length and vitreous-coated upon its metallic body for another portion of its length, substantially as described.

3. A metallic spindle for temple-rollers, having a vitreous coating permanently applied thereto to constitute a bearing for the roll to co-operate with the said spindle, substantially as described.

4. The combination of a temple-head composed of a trough and cap, a roll, and a vitreous-coated metallic spindle to support said roll, combined with a vitreous-coated washer to constitute an end bearing for the inner end of the said roll, substantially as described.

5. The combination, with a temple-head composed of a trough and cap and a roll, and a spindle for the roll, of a vitreous-surfaced washer surrounding the spindle between the inner end of the said roll and the lip $a^2$ of the cap, to constitute an end bearing for the roll, the said washer having pins or points 2, substantially as described.

In testimony whereof I have signed my name to this specification in the presence of two subscribing witnesses.

CHARLES A. LITTLEFIELD.

Witnesses:
EMMA J. BENNETT,
BERNICE J. NOYES.